US008200967B2

(12) United States Patent
Lucidarme

(10) Patent No.: US 8,200,967 B2
(45) Date of Patent: Jun. 12, 2012

(54) METHOD OF CONFIGURING A NODE, RELATED NODE AND CONFIGURATION SERVER

(75) Inventor: Thierry Lucidarme, Montigny-le-Bretonneux (FR)

(73) Assignee: Rockstar Bidco LP, New York, NY (US)

( * ) Notice: Subject to any disclaimer, the term of this patent is extended or adjusted under 35 U.S.C. 154(b) by 1625 days.

(21) Appl. No.: 11/582,683

(22) Filed: Oct. 18, 2006

(65) Prior Publication Data

US 2008/0095369 A1    Apr. 24, 2008

(51) Int. Cl.
*H04L 29/06*    (2006.01)
(52) U.S. Cl. ............ 713/168; 709/222; 380/30; 380/277
(58) Field of Classification Search ................. 380/277, 380/30; 713/168, 1, 2, 181; 726/2; 709/220, 709/222
See application file for complete search history.

(56) References Cited

U.S. PATENT DOCUMENTS

| | | | | |
|---|---|---|---|---|
| 7,346,344 | B2 * | 3/2008 | Fontaine | 455/418 |
| 7,424,614 | B2 * | 9/2008 | Appenzeller et al. | 713/170 |
| 2004/0240669 | A1 * | 12/2004 | Kempf et al. | 380/277 |
| 2006/0114839 | A1 | 6/2006 | Meier | |
| 2006/0173976 | A1 * | 8/2006 | Vincent et al. | 709/220 |
| 2007/0044143 | A1 * | 2/2007 | Zhu et al. | 726/8 |
| 2007/0118879 | A1 * | 5/2007 | Yeun | 726/3 |

OTHER PUBLICATIONS

A. Seth and S. Keshav, "Practical Security for Disconnected Nodes," Proc. NPSEC 2005.*

A. Seth, D. Kroeker, M. Zaharia, S. Guo, and S. Keshav. "Low-cost Communication for Rural Internet Kiosks Using Mechanical Backhaul", In Proc. MobiCom, Sep. 23-26, 2006.*
"Secure Hash Signature Standard (SHS)", Federal Information Processing Standards, Publication 180-2, NIST, pp. 1-79 (Aug. 2002).
Clifford Cocks, "An Identity Based Encryption Scheme Based on Quadratic Residues", Cryptography and Coding, pp. 360-363, $8^{th}$ IMA International Conference (2001).
Dan Boneh, et al., "Identity-Based Encryption from the Weil Pairing", Advances in Cryptology—Proceedings of CRYPTO 2001, pp. 1-27 (2001).
Adi Shamir, "Identity-Based Cryptosystems and Signature Schemes", Proceedings of CRYPTO '84, LNCS 196, pp. 47-53, Springer-Verlag (1984).
M. J. Fischer, et al., "A Secure Protocol for the Oblivious Transfer", Journal of Cryptology, pp. 191-195 (1996).

(Continued)

*Primary Examiner* — Gilberto Barron, Jr.
*Assistant Examiner* — Virginia T Ho
(74) *Attorney, Agent, or Firm* — Barnes & Thornburg LLP

(57) ABSTRACT

A method for configuring a node using a configuration server, as well as the node and the configuration server, are disclosed. The node holds a public key, a related secret key and an address of a configuration server. The node transmits the public and secret keys to the configuration server, which identifies the node by use of an identity based identification algorithm taking account of the public and secret keys. When the node has been successfully identified, the configuration server retrieves a set of configuration parameters stored for the node and transmits this set to the node. Accordingly, the node does not have to store much information. The use of identity-based identification algorithms to identify the node is advantageous regarding nodes that may have very low power/memory which might prevent them from embedding a heavy X.509 certificate traditionally used for identification or authentication purposes.

21 Claims, 2 Drawing Sheets

OTHER PUBLICATIONS

Amos Fiat, et al., "How to Prove Yourself: Practical Solutions to Identification and Signature Problems", Springer-Verlag, pp. 186-194 (1998).

B. Kaliski, Request for Comments 1319, Network Working Group, pp. 1-15 (1992).

IEEE Computer Society and the IEEE Microwave Theory and Techniques Society, IEEE Standard 802.16™ 2004, IEEE Standard for Local and Metropolitan Area Networks, "Part 16: Air Interface for Fixed Broadband Wireless Access Systems," pp. 1-857 (Oct. 1, 2004).

IEEE Computer Society and the IEEE Microwave Theory and Techniques Society, IEEE Standard 802.16e™ 2005 and IEEE Standard 802.16™-2004/Cor1-2005 (Amendment and Corrigendum to IEEE Standard 802.16-2004), IEEE Standard for Local and Metropolitan Area Networks, "Part 16: Air Interface for Fixed and Mobile Broadband Wireless Access Systems," and "Amendment 2: Physical and Medium Access Control Layers for Combined Fixed and Mobile Operation in Licensed Bands," pp. 1-822 (Feb. 28, 2006).

Official Action, and translation, in related CN 200780038950.1, dated May 18, 2011.

* cited by examiner

METHOD OF CONFIGURING A NODE, RELATED NODE AND CONFIGURATION SERVER

BACKGROUND OF THE INVENTION

The present invention relates to node configuration.

The term 'node' is to be understood here as any device or system capable of communicating with at least another node. It includes very basic chip cards, RFID (Radio Frequency Identification Chip) tags, sensors, mobile phones, PDAs (Personal Digital Assistants), base stations, servers, gateways, or even whole telecommunication networks. As a non-limiting example, a node may be an access point of an Ambient Network.

In order to be able to interact with its environment, a node requires some configuration. Of course, such configuration may differ depending on the nature of the node. But it can also depend on the variety of possible environments the node can meet. The environment may even vary in time, especially as far as mobile nodes moving in a radio environment are concerned.

Bandwidth, power, IP versions, IP addresses, security keys, proxy server addresses are some examples of configuration parameters an update version of which a node should be aware in order to communicate.

Due to the above mentioned multiplicity of nodes and environments, it is not easy to store relevant and appropriate configuration parameters in any node once and for all when building it.

Therefore, there is a need for providing any kind of node with relevant and appropriate configuration parameters.

SUMMARY OF THE INVENTION

The invention proposes a method for configuring a node, said node holding a public key depending on an identifier relating to said node, a related secret key and an address of a configuration server storing sets of configuration parameters for respective nodes, the method comprising the following steps carried out at the configuration server:
  identifying said node by use of an identity based identification algorithm taking account of said public and secret keys; and
  when said node has been successfully identified, retrieving the set of configuration parameters stored for said node and transmitting said set of configuration parameters to said node.

In this way, the node does not have to store much information or very specific information initially, since only a public key, a secret key and an address of a configuration server are needed. Moreover, due to the fact that the public key depends on said identifier, the stored information is particularly light, by contrast with traditional X.509 certificates for instance. The configuration parameters can also be obtained at any time by the node after a simple identification by the configuration server. Updated versions of configuration parameters can thus be obtained quite easily.

The invention also proposes a node holding a public key depending on an identifier relating to said node, a related secret key and an address of a configuration server storing sets of configuration parameters for respective nodes, said node comprising:
  means for being identified by the configuration server by use of an identity based identification algorithm taking account of said public and secret keys;
  means for receiving a set of configuration parameters from the configuration server when said node has been successfully identified.

The invention also proposes a configuration server storing sets of configuration parameters for respective nodes each holding a respective public key depending on a respective identifier relating to said node, a respective related secret key and an address of the configuration server, said configuration server comprising in relation with any one of said nodes:
  means for identifying said node by use of an identity based identification algorithm taking account of a said public and secret keys relating to said node; and
  means for retrieving the set of configuration parameters stored for said node and means for transmitting said set of configuration parameters to said node when means for identifying have successfully identified said node.

The preferred features of the above aspects which are indicated by the dependent claims may be combined as appropriate, and may be combined with any of the above aspects of the invention, as would be apparent to a person skilled in the art.

DESCRIPTION OF PREFERRED EMBODIMENTS

Figure 1:
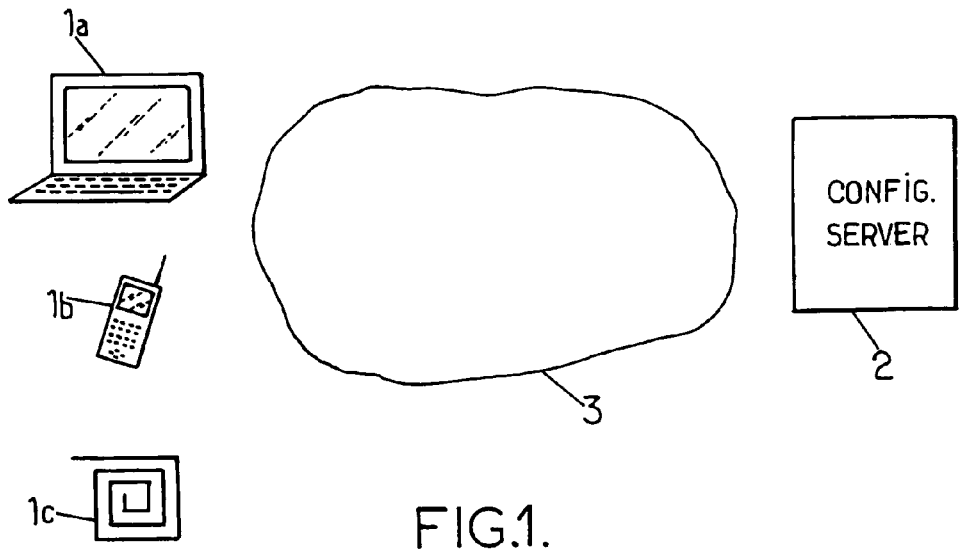
FIG. 1 is a schematic view of a system implementing the invention.

FIG. 1 shows a computer device 1a, a mobile phone 1b and a RFID tag 1c which form respective nodes, which may be part of an Ambient network for instance.

As will be explained in more detail below, each one of these nodes holds minimum required parameters for configuration purposes.

FIG. 1 also shows a configuration server 2 which contains configuration parameters for different nodes, including the nodes 1a, 1b and 1c.

In the present invention, the nodes 1a, 1b and 1c receive relevant and appropriate configuration parameters from the configuration server 2, possibly through a communication network 3 which may contain other nodes.

Since the nodes 1a, 1b and 1c get respective configuration parameters from the configuration server 2, they can contain very few information initially. This may be advantageous when building such nodes. It also allows the nodes to get updated configuration parameters when needed, e.g. when moving inside a radio environment.

Figure 2:
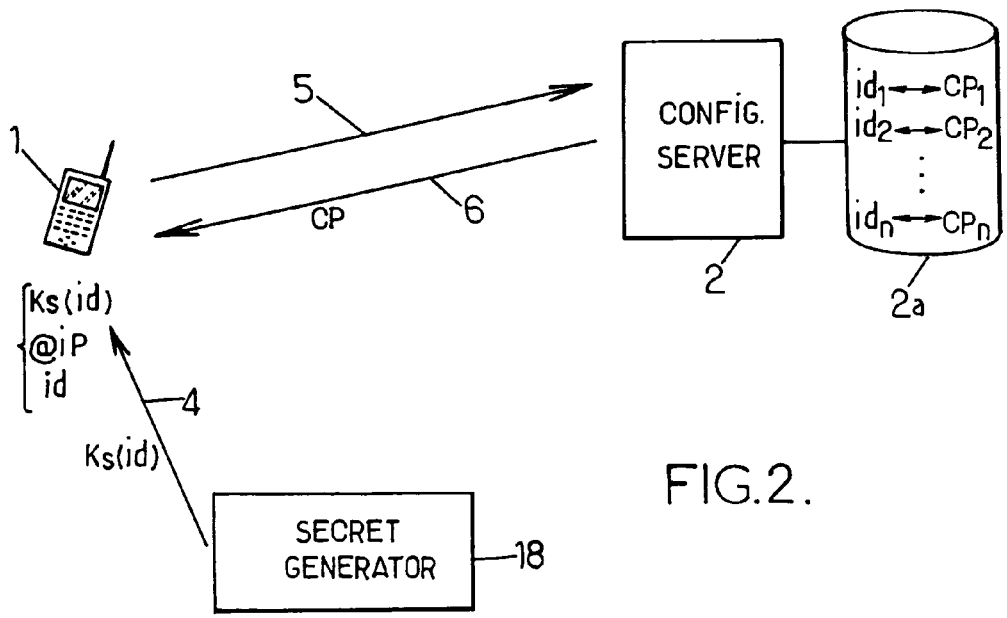
FIG. 2 is a schematic view of main exchanges between a node and a configuration server according to the invention.

FIG. 2 shows in more detail how a node can get configured according to an embodiment of the present invention. In this figure, a node 1, namely a mobile phone, is to be configured.

Initially, i.e. right after being built and sold to its user, the node 1 may hold only three parameters: an identifier (id in FIG. 2) relating to the node 1, i.e. which identifies either the node itself or its user and which may be used as a public key for the node 1 as will be explained below, a function of said identifier (Ks(id) in FIG. 2) which may be used as a secret key for the node 1 as will be explained below and an address of the configuration server 2, e.g. an IP address (@IP in FIG. 2).

As a variant, a one way function h of the identifier id (h(id)) may be held by the node 1 instead of the identifier id itself. This one way function may be a hash function, such as SHA-1 (specified in the "Secure Hash Signature Standard (SHS)" by the NIST (see FIPS PUB 180-2)) or MD5 (see Request For Comments 1319-121 published by the Internet Engineering Task Force (IETF)) for instance. Of course, other one way functions may suit as well.

Advantageously, said identifier id is unique for each node and/or user. It can explicitly define the node and/or user. As a non-limiting example, the identifier id may include the following string: firstname.surname.city@domainname.

Alternatively, the identifier may include an identifier used for other purposes. For instance, when the routing protocol used between the node and configuration server is IP (Internet Protocol) and the allocation of IP addresses is fixed, the identifier id may include the IP address of the node.

Likewise, when the node is a mobile phone for instance, it is coupled to a SIM (Subscriber Identity Module) card characterizing the user of the mobile phone. The SIM card contains a user identity called IMSI (International Mobile Subscriber Identity), which could be included in the identifier id for configuration purposes according to the invention.

Although the node 1 may hold the three above mentioned parameters only, it may also hold additional parameters. However, it will be understood that most or all the configuration parameters intended to be used by the node 1 (e.g. bandwidth, power, IP versions, IP addresses, security keys, proxy server addresses, etc.) are not stored in said node initially.

The secret key Ks(id) may be provided to the node 1 in many different ways. In the example illustrated in FIG. 2, a secret generator 18 is the entity that generates Ks(id) by applying a trapdoor function to the identifier id (or h(id)) relating to the node 1. The secret generator 18 then sends the secret key generated to the node 1 (step 4).

On the other hand, the configuration server 2 has access to a database 2a which may be internal or external. This database 2a stores sets of configuration parameters $CP_1, CP_2, \ldots, CP_n$ for respective nodes identified by $id_1, id_2, \ldots, id_n$ respectively.

In step 5, the configuration server 2 identifies the node 1 by use of an identity based identification algorithm. This identification step may be requested by the node 1. During this step, the node 1 and the configuration server 2 exchange messages. Messages can be sent from the node 1 to the configuration server 2 due to the fact that the node 1 knows the address @IP of the configuration server 2.

Non-limiting examples of identity based identification algorithms will be described below with reference to FIGS. 3 and 4. The particularity of such algorithms is that they take account of a public key which depends on an identifier relating to the entity to be identified. They also take account of a related secret key also depending on said identifier, since the secret key derives from the public key by use of a trapdoor function.

At the beginning of the identification step 5, the node 1 sends its identifier id (or h(id)) to the configuration server 2. The configuration server 2 then authenticates whether or not the node 1 is really the one with said identifier id.

When the configuration server 2 has successfully identified the node 1, it is capable of retrieving the corresponding set of configuration parameters CP in the database 2a, from the identifier id (or h(id)). It can then transmit CP to the node 1 (step 6). As mentioned above, the identifier id may include a routing address such as the IP address of the node, which allows CP to be sent from the configuration server 2 to the node 1. In this way, the node 1 finally holds the needed configuration parameters, which makes it able to communicate properly with other nodes.

The transmission of the configuration parameters CP from the configuration server 2 to the node 1 may be carried out in clear or in an encrypted way. The encryption can be performed in different ways. A first possibility is to establish a secure tunnel between the configuration server 2 and the node 1 as well known. A second possibility is to use an identity based encryption algorithm, such as the Cocks' algorithm described in the article "An Identity Based Encryption Scheme Based on Quadratic Residues", Cryptography and Coding, 8th IMA International Conference, 2001, pp360-363, or the Boneh-Franklin's algorithm "Identity-Based Encryption from the Weil Pairing", Advances in Cryptology—Proceedings of CRYPTO 2001 (2001).

When using an identity based encryption algorithm, the configuration server 2 encrypts the transmission of CP with a public key which may be different from the one used to identify the node 1. Typically, this second public key may use a hash function h' different from h. The second public key may also depend on an identifier of the configuration server 2 in addition or in replacement of the identifier id relating to the node 1. In this case, the node 1 should further hold a second secret key initially in order to decrypt the messages received from the configuration server 2.

It should be noted that the use of an identity based identification algorithm to identify the node is really advantageous, because some nodes may have very low power/memory which might prevent them from embedding a heavy X.509 certificate traditionally used for identification or authentication purposes. The heavy PKI (Public Key Infrastructure) infrastructure is also avoided. Moreover, the exchanges between the node and the configuration server are quite light and thus compatible with low bandwidth systems.

Figure 3:
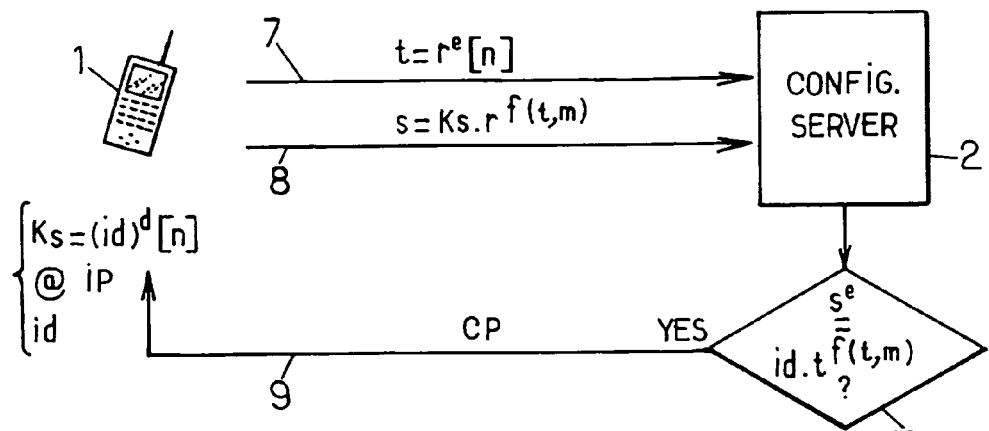
FIG. 3 is a first example of configuration using the Shamir's identity-based identification algorithm.

FIG. 3 shows an example of configuration of a node 1 including an identity-based identification using the Shamir's algorithm described in "Identity-based cryptosystems and signature schemes", Proceedings of CRYPTO'84, LNCS 196, page 47-53, Springer-Verlag, 1984.

In this example, the public key for the node 1 includes the identifier id. Advantageously, the public key may also incorporate other information, such as an expiry date for configuring the node 1, in which case the configuration parameters may be sent to the node 1 only if the current date is no later than this expiry date. This public key is id sent to the configuration server 2 by the node 1.

Moreover, the node 1 has been provided with $Ks=(id)^d$ [n] as a secret key, where [.] designates the modulo operation, n=p.q, p and q being two long prime integers and d is an integer such that ed=1 [(p−1)(q−1)], e being another integer. While e and n are public, p and q are not (i.e. the factorization of n is not public).

The node 1 generates a random number r and calculates $t=r^e$ [n] and $s=Ks.r^{f(t,m)}$ [n], where f is a one way function which may be the above mentioned function h, e.g. a hash function such as SHA-1 or MD5, and m is a known message. Advantageously, m can be set to id. The node 1 then sends t and s to the configuration server 2 (steps 7 and 8).

The configuration server 2 calculates $s^e=(Ks)^e.r^{e.f(t,m)}$ [n] and checks whether it equals $id.t^{f(t,m)}$ [n]. If the check is positive, the configuration server 2 concludes that the node 1 is really the one relating to the identifier id, which means that the node 1 has been successfully identified. The configuration server 2 can then retrieve the configuration parameters CP corresponding to this id and return them to the node 1 (step 9).

Figure 4:
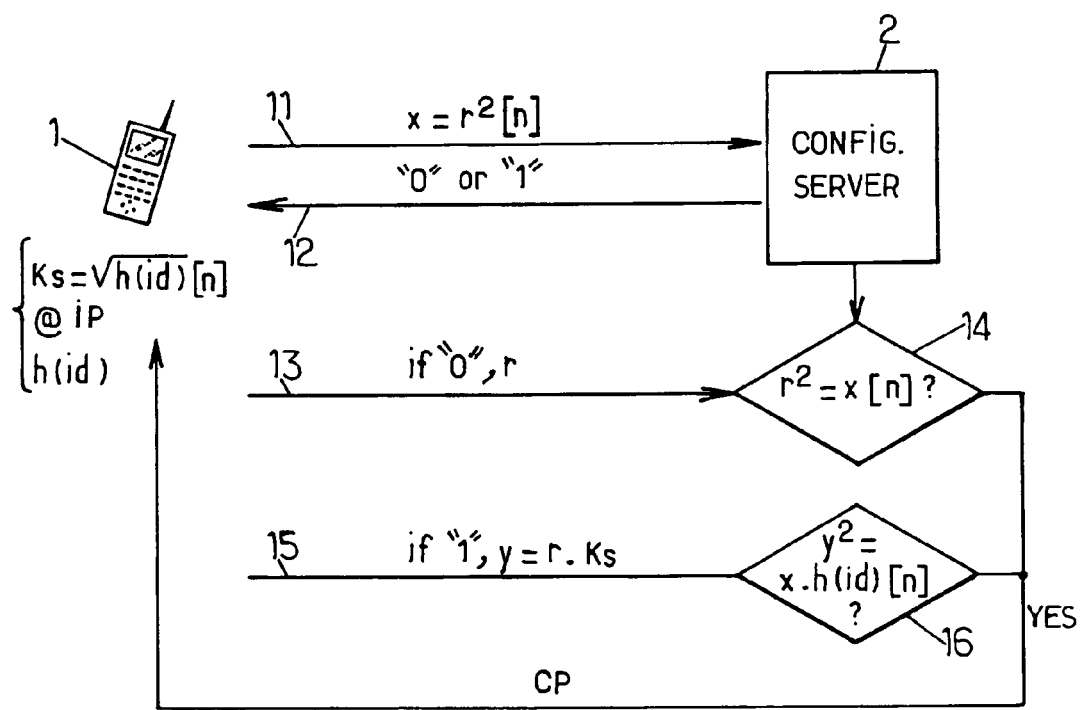
FIG. 4 is a second example of configuration using the Fischer-Micali-Rackoffs identity-based identification algorithm.

FIG. 4 shows another example of configuration of a node 1 including an identity-based identification using the Fischer-Micali-Rackoff's algorithm described in "A secure protocol for the oblivious transfer", 1984, presented at EuroCrypt 84.

The node 1 holds h(id) as a public key and sends it (or id) to the configuration server 2. Like in the previous example, the public key may also incorporate other information, such as an expiry date for configuring the node 1.

The node 1 also holds, as a secret key, $Ks=\sqrt{h(id)}\,[n]$, where $n=p.q$, p and q being two secret long primes. Although h(id) is public, a third party cannot easily obtain Ks, since the calculation of the square root requires to know the factorization of n (Chinese remainder theorem).

The node 1 chooses a random number r, calculates $x=r^2\,[n]$ and sends x to the configuration server 2 (step 11). The configuration server 2 returns a challenge "0" or "1" to the node 1 (step 12).

If "0" is received by the node 1, the latter sends r to the configuration server 2 (step 13). In this case, the configuration server 2 calculates $r^2$ and checks whether this equals x[n] (step 14).

If "1" is received by the node 1, the latter sends y=r.Ks to the configuration server 2 (step 15). In this case, the configuration server 2 calculates $y^2$ and checks whether this equals x.h(id) [n] (step 16), which is possible because the public key h(id) is known to the configuration server 2. If the check is positive, which means that the node 1 has been successfully identified, the configuration server 2 retrieves the configuration parameters CP corresponding to id and return them to the node 1.

A sequence including successive challenges "0" or "1" (e.g. one "0" and then one "1") may advantageously be transmitted to the node 1 by the configuration server 2, before the latter transmits the relevant configuration parameters CP to the node 1.

In a non-limiting example of application of the present invention, the node to be configured may be a home gateway (HGW). A HGW provides a radio interface similar to that of a cellular infrastructure, and it interfaces with a cellular network. The coverage of the HGW can be considered as a cell of the network, to which it is fully integrated. For such a node, the configuration parameters to be provided by the configuration server may include a radio network controller address, scrambling codes, a location area code, a routing area code, a reference macrocell identity, etc.

Of course, the present invention may apply to various other types of nodes as well.

We claim:

1. A method for configuring a node, said node holding a public key depending on an identifier relating to said node, a related secret key and an address of a configuration server storing sets of configuration parameters for respective nodes, the method comprising the following steps carried out at the configuration server:

identifying said node by use of an identity based identification algorithm taking account of said public and secret keys; and when said node has been successfully identified, retrieving the set of configuration parameters stored for said node and transmitting said set of configuration parameters to said node.

2. The method as claimed in claim 1, wherein said node holds no other parameter than said public key, said secret key and said address of the configuration server before it is identified by the configuration server.

3. The method as claimed in claim 1, wherein said public key comprises a one way function of said identifier.

4. The method as claimed in claim 3, wherein said public key comprises a hash function of said identifier as a one way function.

5. The method as claimed in claim 1, wherein said secret key is provided to said node by a secret generator knowing said identifier.

6. The method as claimed in claim 1, wherein transmitting said set of configuration parameters to said node is carried out in an encrypted way.

7. The method as claimed in claim 6, wherein said encrypted way uses an identity based encryption algorithm.

8. A node holding a public key depending on an identifier relating to said node, a related secret key and an address of a configuration server storing sets of configuration parameters for respective nodes, said node comprising:

a transmitter adapted to transmit said public key and a value related to or derived from the secret key to the configuration server; and a receiver adapted to receive a set of configuration parameters from the configuration server when said node has been successfully identified by the configuration server by use of an identity based identification algorithm taking account of said public and secret keys.

9. The node as claimed in claim 8, said node holding no other parameter than said public key, said secret key and said address of the configuration server before it is identified by the configuration server.

10. The node as claimed in claim 8, wherein said public key comprises a one way function of said identifier.

11. The node as claimed in claim 10, wherein said public key comprises a hash function of said identifier as a one way function.

12. The node as claimed in claim 8, the receiver further adapted to receive said secret key from a secret generator knowing said identifier.

13. The node as claimed in claim 8, wherein the set of configuration parameters received by the receiver is encrypted, the node further comprising a processor for decrypting said encrypted set of configuration parameters.

14. The node as claimed in claim 13, wherein the processor uses an identity based decryption algorithm.

15. The node as claimed in claim 8, said node being part of an Ambient network.

16. The node as claimed in claim 8, said node being a home gateway.

17. A configuration server storing sets of configuration parameters for respective nodes, each node holding a respective public key depending on a respective identifier relating to said node, a respective related secret key and an address of the configuration server, said configuration server comprising in relation with any one of said nodes:

a processor for identifying said node by use of an identity based identification algorithm taking account of the public and secret keys relating to said node;

a connection to a database for retrieving a set of configuration parameters stored for said node; and a transmitter adapted to transmit said set of configuration parameters to said node when said processor has successfully identified said node.

18. The configuration server as claimed in claim 17, wherein the processor is adapted to use an identity based identification algorithm taking account of the public key comprising a one way function of said identifier.

19. The configuration server as claimed in claim 18, wherein the processor is further adapted to use an identity based identification algorithm taking account of the public key comprising a hash function of said identifier as a one way function.

20. The configuration server as claimed in claim 17, wherein said transmitter is adapted to transmit said set of configuration parameters to said node in an encrypted way.

21. The configuration server as claimed in claim 20, wherein said encrypted way uses an identity based encryption algorithm.

* * * * *